Nov. 21, 1933. C. C. FARMER 1,935,793
QUICK SERVICE SPRING MECHANISM
Filed March 25, 1932 2 Sheets-Sheet 1
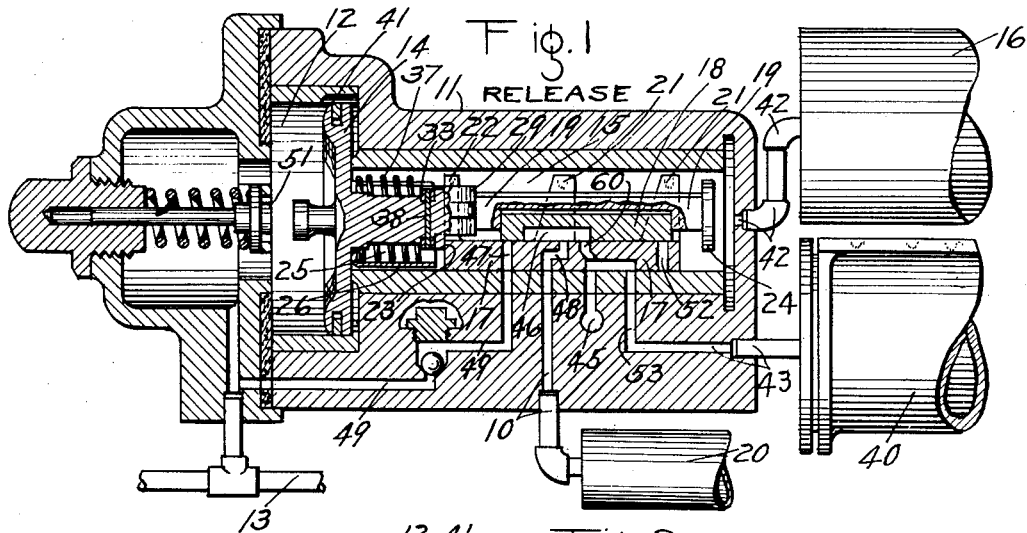
Fig. 1 RELEASE
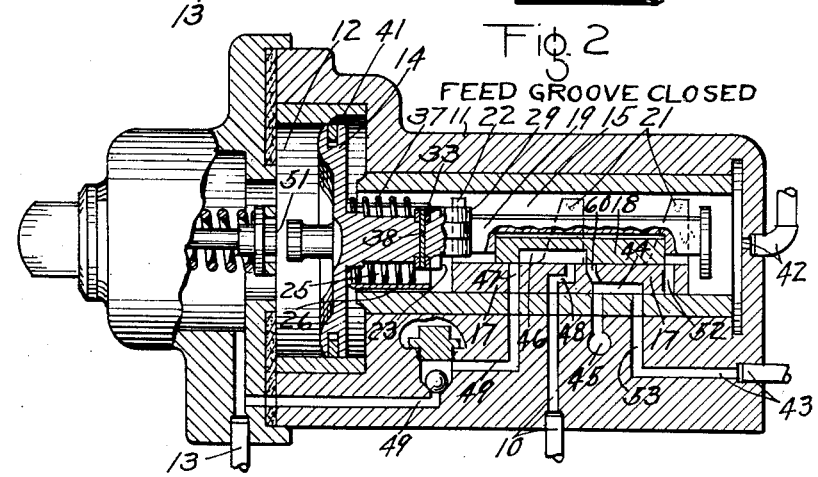
Fig. 2 FEED GROOVE CLOSED
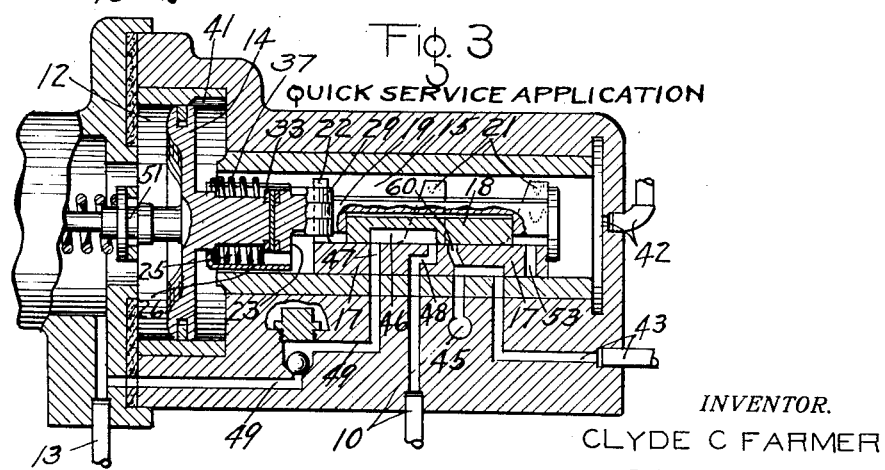
Fig. 3 QUICK SERVICE APPLICATION
INVENTOR.
CLYDE C FARMER
By Wm. M. Cady
ATTORNEY.

Nov. 21, 1933.  C. C. FARMER  1,935,793
QUICK SERVICE SPRING MECHANISM
Filed March 25, 1932  2 Sheets-Sheet 2
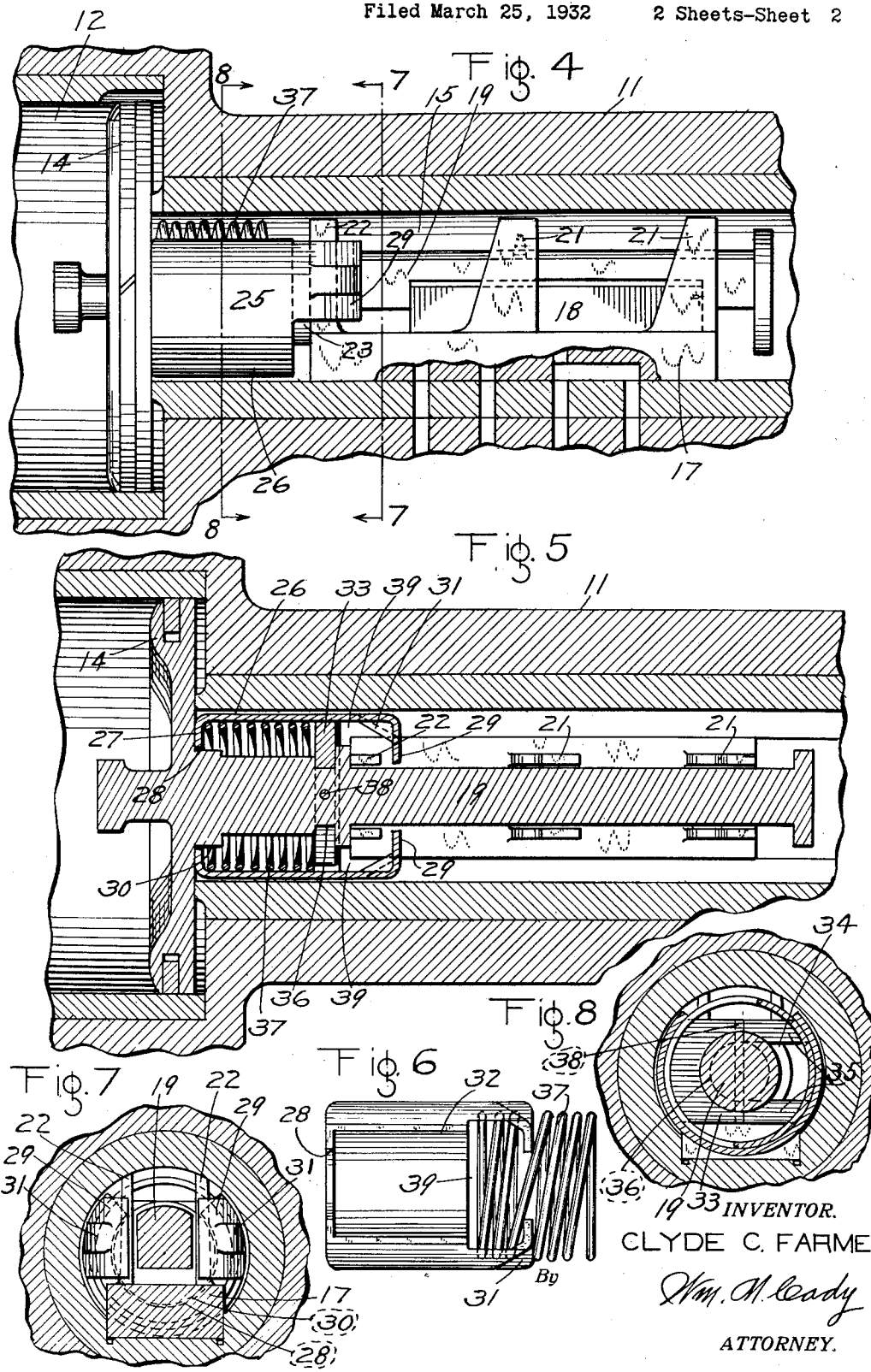
INVENTOR.
CLYDE C. FARMER
By Wm. N. Cady
ATTORNEY.

Patented Nov. 21, 1933

1,935,793

UNITED STATES PATENT OFFICE 1,935,793

QUICK SERVICE SPRING MECHANISM

Clyde C. Farmer, Pittsburgh, Pa., assignor to The Westinghouse Air Brake Company, Wilmerding, Pa., a corporation of Pennsylvania Application March 25, 1932. Serial No. 601,088

17 Claims. (Cl. 303—38)

This invention relates to fluid pressure brakes of the well known automatic type in which the brakes are applied by effecting a reduction in brake pipe pressure and are released by effecting an increase in brake pipe pressure.

In my copending applications, Serial Nos. 473,323 and 553,064, filed respectively, August 6, 1930, and July 25, 1931, triple valve devices are disclosed wherein yielding resilient means are associated with the main slide valve, piston, piston stem and graduating slide valve of the triple valve device in such manner, that after the piston and graduating valve move upon a light reduction in brake pipe pressure to close the usual feed groove, said means so acts on the piston as to require a further and predetermined reduction in brake pipe pressure for causing the piston to move the usual graduating valve to quick service position.

It is an object of this invention to provide a resilient yielding device of simplified construction for the purposes set forth above, wherein the major portion of the device may be inexpensively made from sheet metal by drawing and stamping operations, and wherein the parts may be readily assembled upon the piston stem.

A further object of the invention is to provide a resilient yielding device having the above noted characteristics and which may readily be assembled upon a standard piston stem adjacent the piston in the space between the main slide valve and the piston without necessitating material alterations in the standard stem and slide valve, thereby rendering the resilient device applicable to certain standard triple valves having insufficient space available at the end of the stem or at the side of the triple valve to accommodate yielding devices of the construction shown in the said copending application.

These and other objects that will be made apparent throughout the further description of the invention are attained by means of the triple valve construction hereinafter described and illustrated in the accompanying drawings wherein;

Figs. 1, 2 and 3 are sectional views, partially in elevation, showing a triple valve construction embodying features of the invention, with the triple valve piston in release, feed groove closed, and quick service application positions, respectively;

Fig. 4 is an enlarged sectional view, partially in elevation, of a fragment of the valve structure shown in Figs. 1, 2 and 3;

Fig. 5 is a sectional view, partially in elevation, of the valve structure shown in Fig. 4, the section being taken through the longitudinal axis of the piston and at a right angle to the plane of the section shown in Fig. 4;

Fig. 6 is a plan view of the spring containing shell or casing showing the manner of assembling a spring within the shell; and Figs. 7 and 8 are transverse sections taken on the lines 7—7 and 8—8 respectively of Fig. 4.

Referring to the drawings, the triple valve device 11 may comprise a casing having a piston chamber 12 connected to the brake pipe 13 and containing a piston 14, and having a valve chamber 15, connected to the auxiliary reservoir 16 and containing a main slide valve 17 and an auxiliary or graduating slide valve 18, mounted on and having a movement relative to the main slide valve, said valves being operated by said piston through a piston stem 19 which is slidably mounted between two rows of guide wings 21 and 22, the former serving as guides for the graduating valve 18.

The slide valve 17 is disposed between a stop shoulder 23 of the stem 19 and a stop flange 24 on the end of the stem, and the shoulder 23 and flange 24 are so spaced that the stem may be moved within certain limits without effecting movement of the main slide valve. The graduating valve 18 is so connected to the stem 19 that it moves with the stem and may lap and uncover ports in the main slide valve as will hereinafter appear.

For a purpose that will hereinafter be made apparent, the stem is provided with a resilient yielding device 25 adapted to yieldingly oppose relative movement of the piston with respect to the main slide valve after the piston has moved a slight distance from release position and this device 25 may comprise, referring particularly to Figs. 4 to 8, a pressed metal shell or casing 26 having at one end an inwardly turned end flange 27 provided with an opening 28 for slidably receiving an enlarged cylindrical portion 30 of the stem 19, and at the other end a pair of inwardly extending stop fingers 29 that are adapted to engage the wings 22 of the main slide valve 17.

The side of the shell 26 is indented at 31 to provide reinforcing webs for stiffening the fingers 29 and the shell is provided on its upper side with a rectangular opening 32 through which a lock washer 33 may be inserted during the assembly of the device upon the stem.

The lock washer 33 is slotted at 34 to provide two spaced prongs 35 that fit into an annular groove 36 in the stem 19 as shown in Figs. 5, 7 and 8.

To assemble the yielding device, a helical spring 37 is first inserted within the shell 26 in the manner indicated in Fig. 6, that is, by first meshing the coils of the spring with the fingers 29 and then turning the spring so that the fingers 29 cause it to move into the shell in the manner of a threaded screw. The shell and spring is then slipped over the stem into the position shown in Fig. 4, wherein the inner end of the shell engages the piston 14.

The spring 37 is next compressed and the lock washer 33 inserted through the opening 32 in the shell so that the prongs 35 enter the annular groove 36 in the stem. The washer 33 is then turned through 90° and a pin 38 inserted in registering holes in the washer and the stem. The spring 37 is thus confined within the shell between the end flange 27 thereof and the lock washer 33.

The slide valve 17 is then moved transversely with respect to the stem with the wings 22 straddling the stem 19 and extending into the space 39 between the right end of the shell and the fingers 29. The fingers 29 are thus in position to engage the wings 22 of the main valve 17 when the piston 14 is moved toward the left. The complete assembly of the piston, stem yielding device and valves may then be placed in position within the casing. As will hereinafter appear, when the piston 14 is moved toward the right, the shoulder 23 engages the left end of the main slide valve 17 and moves it toward the right.

In operation to initially charge the brake equipment, fluid under pressure is supplied to the brake pipe 13 in the usual manner and from thence flows to the triple valve piston chamber 12. With the triple valve piston 14 in full release position, as shown in Fig. 1, fluid flows from the chamber 12 through a feed groove 41 to valve chamber 15, and from thence through passage and pipe 42 to the auxiliary reservoir 16, thereby charging the valve chamber 15 and the auxiliary reservoir 16 to brake pipe pressure.

With the triple valve slide valves 17 and 18 in the full release position shown in Fig. 1, the brake cylinder is connected to the atmosphere in the usual manner through pipe and passage 43, the usual exhaust cavity 44 in the main slide valve 17 and the atmospheric passage 45, and the bulb 20 is connected to the atmosphere through pipe and passage 10, port 48 in the main slide valve 17, cavity 46, port 60 in the main slide valve 17 and atmospheric passage 45.

With the triple valve piston 14 and slide valves 17 and 18 in the full release position as shown in Figs. 1, 4 and 5, in which shoulder 23 on the piston stem 19 engages the end of the main slide valve 17, it will be noted that the fingers 29 are moved away from the wing 22 on the slide valve.

If it is desired to effect a service application of the brakes, fluid under pressure is gradually vented from the brake pipe 13 and the connected triple valve piston chamber 12 by operation of the usual brake valve device (not shown). When the pressure in piston chamber 12 is thus reduced slightly below auxiliary reservoir pressure acting in valve chamber 15, as for example less than one pound, the piston 14 moves and closes the feed groove 41. This movement of piston 14 moves the graduating valve 18 relative to the main slide valve 17 and at substantially the same time as the feed groove is closed, the fingers 29 engage the wings 22, as shown in Fig. 2. Further movement of the piston 14 is then resisted by the spring 37, but when the brake pipe pressure is reduced a predetermined but light amount, for example, a reduction of one pound, the resistance of the spring 37 is overcome, permitting the piston 14 to move the graduating valve 18 to quick service position, as shown in Fig. 3, without moving the main slide valve 17 from the full release position.

In the quick service position of the graduating valve 18, a cavity 46 connects port 47 in the main slide valve to port 48 in the main slide valve. In full release position of the main slide valve 17, port 47 registers with the passage 49 leading from the brake pipe 13 to the seat of the main slide valve 17 and the brake cylinder is open to the atmosphere as above indicated. In the quick service position of the side valves, fluid under pressure flows from the brake pipe to the quick service bulb 20 through passage 49, cavity 46 in the graduating slide valve 18, port 48 in the main slide valve 17 and passage and pipe 10, thus reducing the brake pipe pressure at such a rate as to cause a quick service action of the triple valve device on the next succeeding car. In this manner, quick service action is serially propagated throughout the equipment of the cars of the train.

When the brake pipe pressure in piston chamber 12 is reduced by operation of the brake valve device and quick service venting of fluid under pressure from the brake pipe, the triple valve piston 14 and slide valves 17 and 18 are positively moved to service position on each car, in which position the piston 14 engages a spring stop 51 and a service port 52 in the main slide valve registers with a passage 53 connected to the brake cylinder passage and pipe 43. The service port 52 is uncovered by the movement of the graduating valve 18 to quick service position, so that in service position of the main slide valve 17, fluid under pressure flows from the valve chamber 15 and the connected auxiliary reservoir 16 through port 52 and passage and pipe 43 to the brake cylinder 40 and applies the brakes.

From the foregoing, it will be noted that in effecting a service application of the brakes, the triple valve piston is promptly moved upon a slight reduction in brake pipe pressure to close the feed groove so as to cut off the back flow of fluid under pressure from the auxiliary reservoir to the brake pipe. When the feed groove is thus closed, the fingers of the yielding resistance device carried by the piston stem become effective to prevent further movement of the piston to quick service position until a definite, predetermined light reduction in brake pipe pressure is obtained. In this respect, the improved yielding resistance device performs the same function as the resistance devices disclosed in the said copending applications and therefore no further description of the operation of the triple valve device will be given herein except to state that when the brake pipe pressure is increased to release the brakes, the piston 14 is moved to release position when the brake pipe pressure and the pressure within the piston chamber 12 exceeds that of the auxiliary reservoir pressure. Movement of the piston to full release position returns the slide valves 17 and 18 to the full release position shown in Fig. 1, wherein the brake cylinder is open to atmosphere and the auxiliary reservoir is charged with fluid under pressure in the manner previously described.

From the foregoing description of the invention, it is apparent that a relatively inexpensive yielding resistance device is provided that may be applied to standard triple valve devices without necessitating material alterations therein and because of the compact nature of the structure, the device may be mounted upon the piston stem in the space between the main slide valve and the piston.

While the device is disclosed as applied to a triple valve device construction illustrated in the drawings, it is obvious that the device is applicable to other forms of valve devices where it is desirable to obtain a retarded action of the valve.

While but one embodiment of the invention is disclosed, it is obvious that many changes, omissions and additions may be made in the construction without departing from the spirit of the invention.

Having now described my invention, what I claim as new and desire to secure by Letters Patent, is:

1. In a triple valve device, the combination with a piston having a stem, a main valve and a graduating valve operated by the stem and cooperating with said main valve, of a yielding resistance device carried by the piston and mounted in the space between the piston and the said main valve and having a lost motion connection to the main valve and cooperating with the main valve for yieldingly resisting movement of the piston and graduating valve with respect to the main valve after a predetermined movement of the stem.

2. In a triple valve device, the combination with a piston having a stem, a main valve having a lost motion connection to the stem and a graduating valve cooperating with the said main valve and operated by the stem, of a yielding resistance device movable with the stem and mounted in the space between the piston and the said main valve and biased toward the piston, and means carried by the main valve for engaging said device upon a predetermined movement of said stem, whereby the device operates to yieldingly oppose movement of said stem and the graduating valve relative to the main valve.

3. In a triple valve device, the combination with a piston having a stem, a main valve and a graduating valve operated by the stem and cooperating with said main valve, of a yielding resistance device mounted on the stem and comprising a casing, a spring surrounding the stem and interposed between the stem and the said casing and biasing the casing toward the piston, the casing being adapted to engage the main valve and yieldingly oppose movement of the piston with respect to the main valve in a direction away from the main valve.

4. In a triple valve device, the combination with a piston having a stem, a main valve and a graduating valve operated by the stem and cooperating with said main valve, of a yielding resistance device mounted on the stem and comprising a casing surrounding the stem, a spring surrounding the stem and disposed within said casing between the stem and said casing and biasing the casing toward the piston, the casing being adapted to engage the main valve and yieldingly resist movement of the piston with respect to the main valve in a direction away from the main valve.

5. In a triple valve device, the combination with a piston having a stem, a main valve and a graduating valve operated by the stem and cooperating with said main valve, of a yielding resistance device mounted on the stem and comprising a casing, a spring surrounding the stem and interposed between the stem and the said casing and biasing the casing toward the piston, the casing being adapted to engage the main valve and yieldingly oppose movement of the piston after a predetermined movement thereof with respect to the main valve in a direction away from the main valve.

6. In a triple valve device, the combination with a piston having a stem, a main valve and a graduating valve operated by the stem and cooperating with said main valve, of a yielding resistance device mounted on the stem and comprising a casing surrounding the stem, a spring surrounding the stem and disposed within said casing between the stem and said casing and biasing the casing toward the piston, the casing being adapted to engage the main valve and yieldingly resist movement of the piston after a predetermined movement thereof with respect to the main valve in a direction away from the main valve.

7. In a triple valve device, the combination with a piston having a stem, a main valve and a graduating valve operated by the stem and cooperating with said main valve, of a yielding resistance device mounted on the stem and comprising a casing surrounding the stem, an abutment within the casing and detachably connected to the stem, a spring surrounding the stem and disposed within the casing between said abutment and said casing, the casing being adapted to engage the main valve and yieldingly resist movement of the piston with respect to the main valve.

8. In a triple valve device, the combination with a piston having a stem, a pair of relatively movable cooperating valves, one of which is movable with the stem, of a yielding resistance device movable with the stem and biased toward the piston and mounted in the space between the piston and the other said valve and cooperating with the other said valve for yieldingly resisting movement of the piston and the first said valve after a predetermined movement thereof in a direction away from the main valve.

9. In a triple valve device, the combination with a piston having a stem, a main valve having guide wings on opposite sides of the stem, and a graduating valve operated by the stem and cooperating with said main valve, of a yielding resistance device mounted on the stem and comprising a casing surrounding the stem, a spring within the casing interposed between the stem and the said casing for biasing the casing toward the said piston, the casing being provided with fingers for engaging the wings on the main valve and for yieldingly resisting movement of the piston with respect to the main valve in a direction away from the main valve.

10. A triple valve device comprising a main valve, an auxiliary valve movable relatively to the main valve, a piston stem for operating said valves, a piston for operating said stem, a spring associated with said stem adjacent to said piston, a member engaging said spring, means carried by said stem for pressing said spring into engagement with said member, and an element carried by said main valve for engaging said member upon movement of said stem by said piston.

11. A triple valve device comprising a main valve, an auxiliary valve movable relatively to the main valve, a piston stem for operating said valves, a piston for operating said stem, a spring associated with said stem adjacent to said piston, a member having a portion interposed between said piston and said spring, means for locking said spring under initial compression, and means carried by said main valve for engaging said member upon a predetermined movement of said piston and stem.

12. In a fluid pressure brake, the combination with a brake pipe and a triple valve device comprising a main valve, an auxiliary valve movable relatively to the main valve for venting fluid from the brake pipe, a piston stem for operating said valves, and a piston for operating said stem upon a reduction in brake pipe pressure, of a spring associated with said stem adjacent to said piston, a member engaging said spring, means carried by said stem for holding said spring in engagement with said member, and means carried by said main valve for engaging said member upon a predetermined movement of said stem, whereby said spring operates through said member to yieldingly oppose movement of said stem and the auxiliary valve relative to the main valve.

13. In a triple valve device, the combination with a piston having a stem, a main valve and a graduating valve operated by the stem and cooperating with said main valve, of a yielding resistance device mounted on the stem in the space between the main valve and the piston and comprising a member normally yieldingly biased toward the piston and having a portion adapted to engage the said main valve for yieldingly opposing movement of the piston and graduating valve with respect to the main valve.

14. In a triple valve device, the combination with a piston having a stem, a main valve and a graduating valve operated by the stem and cooperating with said main valve, of a yielding resistance device mounted on the stem in the space between the main valve and the piston and comprising a member normally yieldingly biased toward the piston and having a portion adapted to engage the said main valve for yieldingly opposing movement of the piston and graduating valve with respect to the main valve after a predetermined movement of the stem.

15. In a fluid pressure brake, the combination with a brake pipe and a triple valve device comprising a main valve, an auxiliary valve movable relatively to the main valve, a piston stem for operating said valves and a piston for operating said stem upon a reduction in brake pipe pressure for moving the auxiliary valve in a direction toward the piston for venting fluid from the brake pipe, of a yielding resistance device mounted in the space between the main valve and the piston and comprising a member normally yieldingly biased toward the piston and having a portion adapted to engage the said main valve for yieldingly resisting movement of the piston and auxiliary valve with respect to the main valve in the said direction.

16. In a fluid pressure brake, the combination with a brake pipe and a triple valve device comprising a main valve, an auxiliary valve movable relatively to the main valve, a piston stem having a spring seat for operating said valves, and a piston for operating said stem upon a reduction in brake pipe pressure for moving the auxiliary valve in a direction toward the piston for venting fluid from the brake pipe, of a yielding resistance device comprising a member mounted in the space between the main valve and the piston, a spring disposed between the said spring seat on the stem and the said member for biasing it toward the said piston, and means carried by said main valve for engaging said member upon a predetermined movement of said stem, whereby said spring operates through said member to yieldingly oppose movement of said stem and the auxiliary valve relative to the main valve in a direction toward the said piston.

17. In a fluid pressure brake, the combination with a triple valve device comprising a main valve, an auxiliary valve movable relatively to the main valve in one direction for venting fluid from the brake pipe, a piston stem for operating said valves, and a piston for operating said stem upon a reduction in brake pipe pressure, of a yielding resistance device mounted on the stem adjacent to the piston and comprising a member normally yieldingly biased in the said direction with respect to the stem, and means carried by said main valve for engaging said member upon a predetermined movement of said stem in the said direction, whereby said member operates to yieldingly oppose movement of said stem and the auxiliary valve relative to the main valve.

CLYDE C. FARMER.